US006989877B2

(12) United States Patent
Iijima

(10) Patent No.: US 6,989,877 B2
(45) Date of Patent: Jan. 24, 2006

(54) LIQUID CRYSTAL DISPLAY DEVICE AND ELECTRONIC APPARATUS

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/158,798

(22) Filed: Jun. 3, 2002

(65) Prior Publication Data

US 2003/0001993 A1    Jan. 2, 2003

(30) Foreign Application Priority Data

Jun. 6, 2001 (JP) ............................ 2001-171738
Jul. 30, 2001 (JP) ............................ 2001-230172

(51) Int. Cl.
   *G02F 1/1335* (2006.01)
(52) U.S. Cl. ................. 349/114; 349/113; 349/96; 349/99; 349/102; 349/103
(58) Field of Classification Search ........... 344/114; 349/113, 114, 96, 99, 102, 103
   See application file for complete search history.

(56) References Cited

U.S. PATENT DOCUMENTS

| 4,519,679 | A | * | 5/1985 | Horikiri et al. ............. 349/106 |
| 6,025,897 | A | * | 2/2000 | Weber et al. ................ 349/96 |
| 6,456,346 | B1 | * | 9/2002 | Arai ............................ 349/106 |
| 2002/0145689 | A1 | * | 10/2002 | Kaneko ....................... 349/114 |

FOREIGN PATENT DOCUMENTS

| EP | 0 936 492 A1 | 8/1999 |
| EP | 1 085 363 A2 | 3/2001 |
| JP | A-55-95981 | 7/1980 |
| JP | U-62-137427 | 8/1987 |
| JP | A-04-075025 | 3/1992 |
| JP | A-07-043530 | 2/1995 |
| JP | A-07-072475 | 3/1995 |
| JP | A-11-52357 | 2/1999 |
| JP | A-2000-221505 | 8/2000 |
| JP | A-2001-042317 | 2/2001 |
| JP | A 2001-83508 | 3/2001 |
| JP | A-2001-504238 | 3/2001 |
| JP | A-2001-133629 | 5/2001 |
| KR | 2001-0029823 | 4/2001 |
| WO | WO 97/39380 | 10/1997 |
| WO | WO 99/06880 | 2/1999 |

* cited by examiner

*Primary Examiner*—Dung T. Nguyen
*Assistant Examiner*—George Y. Wang
(74) *Attorney, Agent, or Firm*—Oliff & Berridge, PLC

(57) ABSTRACT

A liquid crystal display device and an electronic apparatus have superior visibility. A transflective reflective liquid crystal device comprises liquid crystals, an upper substrate, an lower substrate, an upper polarizing layer, a reflective polarizing layer, a lower polarizing layer, and a lighting device. A liquid crystal panel comprises the upper substrate, the upper polarizing layer, the liquid crystal, the lower reflective polarizing layer, the lower polarizing layer, and the lower substrate.

13 Claims, 9 Drawing Sheets

TRANSPARENT MODE

REFLECTION MODE

TRANSPARENT MODE

REFLECTION MODE

TRANSPARENT MODE

REFLECTION MODE

LIQUID CRYSTAL DISPLAY DEVICE AND ELECTRONIC APPARATUS

BACKGROUND OF THE INVENTION

1. Field of the Invention

The present invention relates to a liquid crystal display device and an electronic apparatus. The present invention particularly relates to a transflective reflective liquid crystal display device which can perform display with sufficient brightness in transparent mode.

2. Description of Related Art

A reflective liquid crystal display device does not have a light source such as a back light and consumes less electricity. Thus, a reflective liquid crystal display device is mainly used in an auxiliary displaying section for various mobile electronic apparatus and device conventionally. However, in the reflective liquid crystal display device displays by using an external light such as available light and light supplied from a lighting device, there was a problem in understanding what is displayed in a dark environment. From that point of view, a liquid crystal display device in which external light is used like an ordinary reflective liquid crystal display device in a light place, and display is visible in darkness by using an internal light source, is proposed. This kind of liquid crystal display device employs a displaying method compatible with a reflective method and a transparent method, and bright display operation and reduction of energy consumption can be realized by changing the display mode between reflective mode and transparent mode according to the circumstance even if the liquid crystal display is used in a dark condition. Hereinafter in this specification, this kind of liquid crystal display device is called a "transflective reflective liquid crystal display device".

For a transflective reflective liquid crystal display device, a liquid crystal display device provided with a reflective layer made of a metal foil such as aluminum on which light transmitting slits are formed on a surface of a lower substrate is proposed. In such a liquid crystal display device, an influence of parallax due to the thickness of the lower substrate is prevented by forming the metal foil on an inner surface of the lower substrate. Particularly in the case in which a color filter is used, occurrence of color mixing is prevented.

FIG. 12 is a cross section partially showing an example of a transflective reflective liquid crystal display device employing a passive matrix method. In a liquid crystal display device 100, liquid crystals 103 are disposed between a pair of substrates such as an upper substrate 102 and a lower substrate 101. Reflective layers 104 and an insulating layer 106 are layered on the lower substrate 101. Furthermore, a stripe form of scanning electrode 108 made of transparent conductive layer such as Indium Tin Oxide (hereinafter called ITO) is formed on the lower substrate 101, and a orientation layer 107 is formed so as to cover the scanning electrode 108. On the other hand, the color filters 109 are formed on the upper substrate 102, and a flat layer 111 is layered on the color filters 109. Signal electrodes 112 made of transparent conductive layer such as ITO are formed on the flat layer 111 so as to be orthogonal to the scanning electrode 108 in stripe form. An orientation layer 113 is formed so as to cover the signal electrode 112. Reflection layers 104 are formed by metal foil such as aluminum, and light transmitting slits 110 are formed per pixel on the reflection layer 104. An incident light from the lower substrate 101 is transmitted through the slits 110; thus, the reflection layer 104 functions as a transflective reflective layer. Also, a forward scattering plate 118, a phase differentiating plate 119 and an upper polarizing plate 114 are formed on the upper substrate 102 in this order from the upper substrate 102 to the outside. A ¼ wavelength plate 115, a lower polarizing plate 116 are formed on the outside of lower substrate 101. Also, a backlight 117 is attached beneath the lower substrate 101.

When the above liquid crystal display device 100 is used in reflection mode in lighted environments, an external light which is incident from above upper substrate 102 is transmitted through the liquid crystals 103 and is reflected on the surface of the reflection layer 104, and is transmitted through the liquid crystals 103 again and is emitted to the upper substrate 102. When the above liquid crystal display device 100 is used in transparent mode in a dark environment, the light emitted from the backlight 117 located beneath the lower substrate 101 is transmitted through the slits 110 of the reflection layer 104, and is transmitted through the liquid crystals 103, and then is emitted to the upper substrate 102. These lights contribute to the displaying operation in each mode.

In the above liquid crystal display device 100, what is displayed is visible regardless to whether or not there is light. However, there was a problem in which lighting of the display was not sufficient in transparent mode comparing to the reflection mode. This occurs mainly because only the light which is transmitted through the slits 110 of the reflecting layer 104 contributed to the display operation in the transparent mode, and the light was lost in the ¼ wavelength plate 115 and the polarizing plate 116 formed on an outer surface of the lower substrate 101.

In a liquid crystal display device 100 shown in FIG. 9, when display operation is performed in a transparent mode, a light emitted from a backlight 117 is incident on a liquid crystal display device unit from outside of a lower substrate 101, and the light which is transmitted through the slits 110 among the above light contributes to display operation. Here, in order to perform a dark display in a liquid crystal display device 100, the light which runs toward the upper substrate 102 from the slits 110 must be a circular polarized light. Therefore, the light which is emitted from the backlight 117 and is transmitted through the slits 110 also must be a circular polarized light; thus, ¼ wavelength plate 115 for converting light which is transmitted through a lower polarizing plate 116 and is converted to a linear polarized light into a circular polarized light is necessary.

Next, among lights emitted from the backlight 117, a light which is not transmitted through the slits 110 is emitted from the backlight 117 and is transmitted through the lower polarizing plate 116 and is converted into a linear polarized light which is parallel with the paper and is transmitted through the ¼ wavelength plate 115 and becomes a circular polarized light and then reaches a reflection layer 104. When this light is not incident on the slits 110 and is reflected by a surface close to the lower substrate 101 of the reflecting layer 104, this light becomes a circular polarized light having a counter-rotation direction to the circular polarized light which is incident on the reflection layer 104. When this light is transmitted through the ¼ wavelength plate 115, this light is converted to a linear light which is orthogonal to the surface of the drawing. Therefore, this light is absorbed by the lower polarizing boar 116 having a transparent axis which is parallel to the surface of the drawing. That is, among lights emitted from the backlight 117, all the light which is not transmitted through the slits 110 and is reflected on a surface close to a back side of the reflecting layer 104 is absorbed by the lower polarizing plate 116 of the lower substrate 101.

Furthermore, with regard to a case in which a light display is performed in transparent mode in a liquid crystal display device shown in FIG. 12, a light which is transmitted through the slits 110 and is incident on liquid crystals 103 is transmitted through an upper polarizing plate 114 of an upper substrate 102 without being influenced by liquid crystals 103 and is emitted in an upper direction of the liquid crystal display device. However, because the light which travels toward the upper substrate 102 from the slits 110 becomes a circular polarized light because of ¼ wavelength plate 115, almost half the light which travels toward the upper substrate 102 from the slits 110 is absorbed by the upper polarizing plate 114 when being transmitted through the upper polarizing plate 114 having a transparent axis which is parallel with the surface of the drawing.

Due to the above reasons, in the above liquid crystal display device 100, it was not possible to illuminate the display to be brighter in a transparent mode. In order to solve the above problem, a liquid crystal display device having a structure shown in FIG. 13 is proposed. In a liquid crystal display device 200 shown in FIG. 13, liquid crystals 203 are put between a pair of transparent lower substrate 201 and upper substrate 202, a reflecting polarizing layer 204 and an insulating layer 206 are layered on a lower substrate 201, and a scanning electrode 208 made of a transparent conductive layer such as ITO in stripe form is formed thereon, and an orientation layer 207 is formed so as to cover the scanning electrode 208. On the other hand, color filters 209 are formed on an inner surface of the upper substrate 202, and a flat layer 211 is layered thereon. On the flat layer 211, signal electrodes 212 made of a transparent conductive layer such as ITO are formed in stripe form so as to be in an orthogonal direction to the scanning electrode 212. The orientation layer 213 is formed so as to cover the signal electrodes 212. Fine aperture sections having almost 50 nm width of a reflecting polarizing layer 204 are made of a metal layer such as aluminum in a slit form with intervals of 100 nm to 400 nm. Among incident lights to the reflecting polarizing layer 204, polarized light which is parallel with a slit aperture section is reflected, and a polarized light which is orthogonal to the aperture section is transmitted therethrough. On an outer surface of the upper substrate 202, a forward scattering plate 218, a phase differentiating plate 219, and an upper polarizing plate 214 are disposed in this order from the upper substrate 202 in the outer direction. Also, a backlight 217 is disposed beneath the lower substrate 201.

In a liquid crystal display device 200 having the above structure, the light which is incident to the upper polarizing plate 214 is a linear polarized light which is different from a circular polarized light in transparent mode. Such a property is different from the case of a liquid crystal display device 100 shown in FIG. 12; therefore, a liquid crystal display device 200 can illuminate the display in transparent mode compared to the case of a liquid crystal display device 100. Also, the light which is reflected without being transmitted through the reflecting polarizing layer 204 returns to the backlight 217, and during the repetition of the reflection between the reflecting polarizing layer 204 and the backlight 217, the polarization state of such light changes so as to be able to be transmitted through the reflecting polarizing layer 204. Thus, the light of the backlight 217 can be used more effectively than in the case of above liquid crystal display device 100.

However, in the transparent mode of a liquid crystal display device 200, when an external light is incident on the liquid crystal display device 200, displaying contrast of the liquid crystal display device 200 decreases remarkably, and the display becomes invisible sometimes according to the intensity of the external light.

BRIEF SUMMARY OF THE INVENTION

An object of the present invention is to provide a liquid crystal display device which has a reflection mode and a transparent mode, and can improve brightness of the display in transparent mode with superior visibility.

Also, an object of the present invention is to provide an electronic apparatus having a transflective reflective liquid crystal display device having superior visibility.

In order to achieve the above objects, a transflective reflective liquid crystal device is characterized in comprising a first substrate a second substrate, liquid crystals disposed between the first substrate and the second substrate, a first polarizing layer formed over the liquid crystals, a reflective polarizing layer formed under the liquid crystals and having a transparent axis and a reflective axis being orthogonal, a second polarizing layer formed under the liquid crystals, and a lighting device disposed under the second polarizing layer. In the above transflective reflective liquid crystal device, the reflective polarizing layer reflects a part of light which is parallel with the reflective axis and transmits a part of light which is parallel with the reflective axis, and the second polarizing layer is disposed below the reflective polarizing layer.

According to a structure of the present invention, the brightness of the display in a transparent mode can be improved remarkably, the problems concerning the liquid crystal display device 200 in FIG. 13 can be solved, and the display contrast does not decrease even if an external light is incident on the display in a transparent mode.

Next, a liquid crystal display device of the present invention may comprise liquid crystals, a first substrate formed on the liquid crystals, a second substrate liquid crystals disposed between the first substrate and second substrate, a first polarizing layer formed over the liquid crystals, a reflective polarizing layer formed partially inside of the second substrate having a transparent axis and a reflective axis being orthogonal, a second polarizing layer formed under the liquid crystals, and a lighting device disposed outside the second substrate wherein the second polarizing layer is disposed below the reflective polarizing layer.

In this liquid crystal display device, the lighting device may be arranged outside of the lower substrate. The transparent axis and the reflective axis may be orthogonal on the lower reflective polarizing layer, and the displaying operation may be performed by changing between a transparent mode and a reflection mode.

In this way, according to a structure of the present invention, the brightness of the display in a transparent mode can be improved remarkably, the problems concerning the liquid crystal display device 200 in FIG. 13 can be solved, and the display contrast does not decrease even if an external light is incident on the display in a transparent mode.

Next, in a liquid crystal display device of the present invention, it is preferable that transparency of the light which is parallel with a reflection axis of the lower reflecting polarizing layer be between 20% and 70%, and it is more preferable that the transparency be between 30% and 50%.

By making the transparency of the lower reflecting polarizing layer to be within the above range, bright display can be obtained in both transparent mode and reflection mode; thus, a liquid crystal display device having superior visibility can be obtained.

If the above transparency is less than 20%, the amount of light which is incident on the liquid crystal from the lighting device is too small, brightness of the display in a transparent mode is insufficient. If the above transparency is greater than 70%, the incident light is reflected by the lower reflecting polarizing layer in a reflection mode and the amount of light for display is insufficient. Thus, by making the transparency within a range between 30% to 50%, the balance of the brightness in both transparent mode and reflection mode can be favorable and a liquid crystal display device having superior visibility can be obtained.

Next, in a liquid crystal display device of the present invention, a transparent axis of the reflecting polarizing layer and a transparent axis of the lower polarizing layer should preferably be nearly orthogonal. By doing this way, when a dark display is performed in reflecting mode, almost all of the light which transmit through the reflecting polarizing layer can be absorbed by lower polarizing layer. Thus, the dark display becomes darker, the contrast can be improved.

Next, in a liquid crystal display device of the present invention, an angle formed by a transparent axis of the lower reflecting polarizing layer and a transparent axis of the lower polarizing layer should preferably be within the range of 60 degrees to 120 degrees.

It is certainly most preferable that the angle made by a transparent axis of the lower polarizing layer 55 and a transparent axis of the lower reflecting polarizing layer 51 be 90 degrees (orthogonal). If the angle made by the transparent axes is in the range of ±30 degrees, practical use is possible. If the angle made by the transparent axes exceeds such range, the amount of light which is transmitted through the lower polarizing layer 55 increases, and the contrast of the liquid crystal display device decreases.

Next, in the liquid crystal display device of the present invention, a reflecting polarizing plate may be provided on outer surface of the lower polarizing layer. By employing such a structure, the light emitted from the lighting device can be used for display operation more effectively; thus, the display can be brighter in a transparent mode. Such a structure is explained with reference to FIG. 8 as follows.

In a liquid crystal display device of the present invention, an angle made by a transparent axis of the lower polarizing layer and a transparent axis of the reflecting polarizing layer should preferably be in the range of −30 degrees and +30 degrees.

It is certainly most preferable that the angle made by a transparent axis of the lower reflecting polarizing layer 55 and a transparent axis of the reflecting polarizing plate 57 be 0 (zero) degree (both transparent axes are parallel). If the angle made by both transparent axes is in the range of ±30 degrees, practical use is possible. The angle made by both transparent axes exceeds such a range, the amount of the light which is absorbed by the lower polarizing layer 55 increases, efficiency of usage of the light decreases; and thus the brightness of the display decreases.

Next, in a liquid crystal display device of the present invention, a scattering layer for scatter the light which is reflected by the lower reflecting polarizing layer should preferably be formed on or above the reflecting polarizing layer. By doing this, it can be prevented that the intensity of the light which is reflected by the lower reflecting polarizing layer increases in a particular direction; thus, the visibility of the display device becomes superior.

Such a scattering layer can be obtained by forming a layer having light scattering function directly on the reflecting polarizing layer or on the inner surface of the upper substrate. A forward scatter plate may be formed on an outer surface of the upper substrate.

Next, in a liquid crystal display device of the present invention, an upper polarizing layer may be formed on an inner surface of the upper substrate. According to such structure, it is not necessary to dispose a polarizing plate in outer surface of the upper substrate; thus, it becomes possible to reduce manufacturing cost. Also, such a polarizing layer can be formed successively together with a process for forming a color filter and a flattened layer on inner surface of the upper substrate; thus, it becomes possible to manufacture a liquid crystal display device of the present invention without changing the manufacturing process.

In a liquid crystal display device of the present invention, a lower polarizing layer may be disposed on outer surface of the lower substrate. That is, a polarizing plate may be disposed on outer surface of the lower substrate. According to such a structure, a liquid crystal display device can be manufactured using a conventional polarizing plate; thus, a liquid crystal display device of the present invention can be manufactured easily.

Next, in a liquid crystal display device of the present invention, a color filter may be disposed on a upper substrate or on an inner surface of the lower substrate. According to such a structure, color smearing can be restricted, and parallax can be prevented; thus, a liquid crystal display device having a superior visibility can be realized.

Next, in a liquid crystal display device of the present invention, a lower reflecting polarizing layer can be formed by layering a dielectric interfering layer having prismatic structure.

Next, in a liquid crystal display device of the present invention, a lower reflecting polarizing layer can be formed by making a plurality of fine slit opening section on a metal reflecting substrate.

Next, in a electronic apparatus in the present invention is characterized in having a liquid crystal display device of the present invention which is described above. According to such a structure, an electronic apparatus having a superior display section which can obtain brightness of the display in a transparent mode.

EFFECT OF INVENTION

According to a liquid crystal display device having the above structure, bright display can be realized by improving the efficiency of the light which is emitted from the lighting device in a transparent mode. In a reflection mode, dark display can be darker; thus, the contrast can be improved.

Also, according to the present invention, because a liquid crystal display device of the present invention is provided, an electronic apparatus having remarkably bright display and superior contrast can be realized.

BRIEF DESCRIPTION OF THE DRAWINGS

FIG. 5A is a view for showing a case of transparent mode, and FIG. 5B is a view for showing a case of reflection mode.

FIG. 6A shows a case of a transparent mode, and FIG. 6B shows a case of a reflection mode.

FIG. 8A shows a case of a transparent mode, and FIG. 8B shows a case of a reflection mode.

DETAILED DESCRIPTION OF THE INVENTION

First Embodiment

A first embodiment of the present invention is explained with reference to the drawings as follows.

Figure 1:
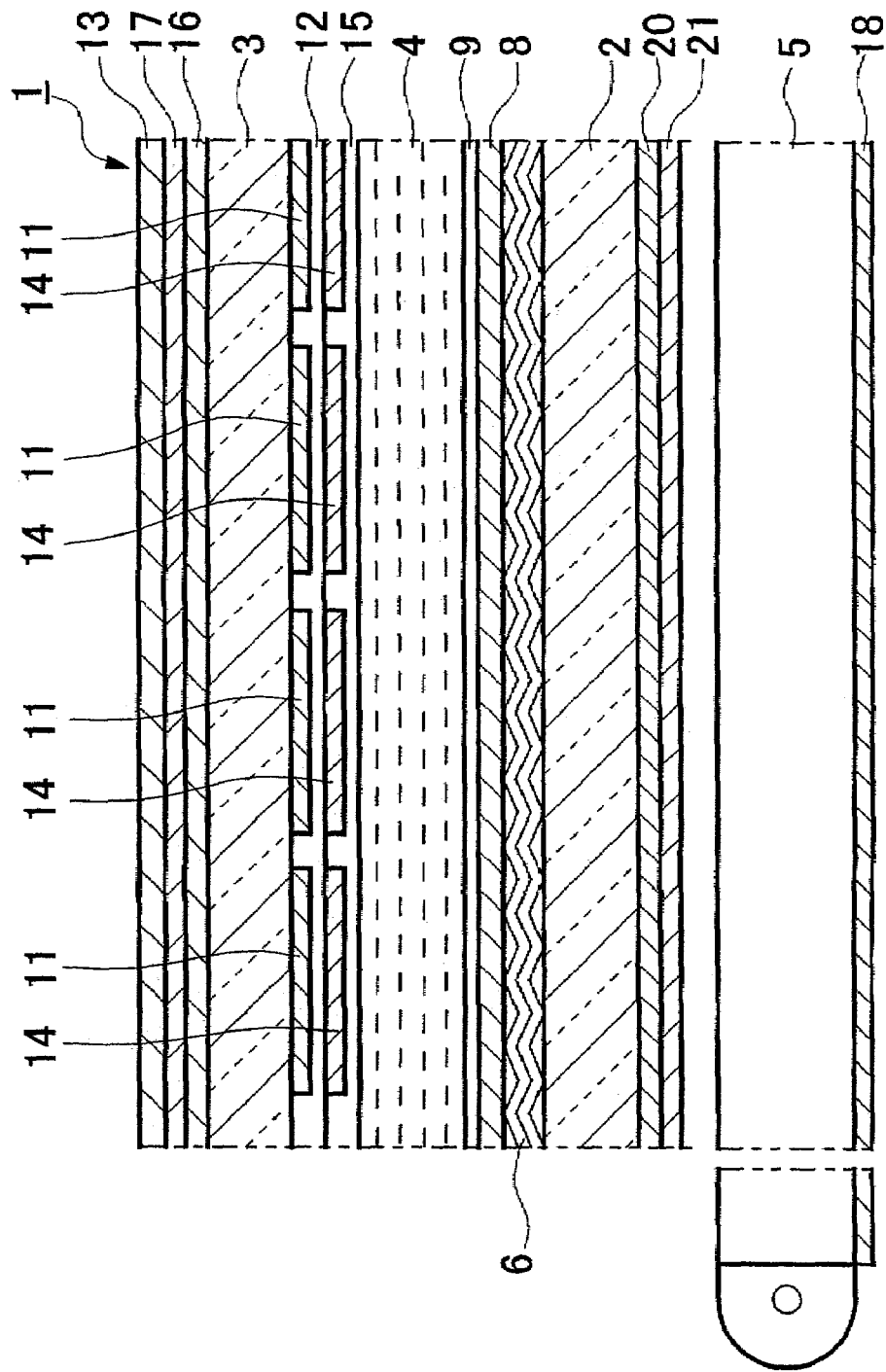
FIG. 1 is a cross section showing a part of a liquid crystal display device of the first embodiment of the present invention.

FIG. 1 is a view showing a part of a cross section of the liquid crystal display device of the present embodiment. The present embodiment is an example of a passive matrix type transflective reflective color liquid crystal display device. In the following drawings, dimensional factors such as thickness of the layers and dimensional ratios are not to scale for the sake of illustration.

A liquid crystal display device 1 of the present embodiment is generally constructed, as shown in FIG. 1, by a liquid crystal panel 1 made by disposing a lower substrate 2 and an upper substrate 3 so as to face each other, and disposing liquid crystal 4 made of STN (Super Twisted Nematic) liquid crystal in a space between the substrates 2 and 3, and a backlight 5 (lighting device) which is disposed near the back side of the liquid crystal panel 1 (near the outer surface of the lower substrate 2).

Near the internal surface of the lower substrate 2 made of glass and resin, the lower reflecting polarizing layer 6 having the same structure shown in FIG. 6 is formed. On the lower reflecting polarizing layer 6, an electrode 8 in stripe form made of a transparent conductive foil such as ITO extends in a horizontal direction in the drawing. Orientation layer 9 made of polyimide or the like is layered so as to cover the electrode 8. Also, near an outer surface of the lower substrate 2, a lower polarizing plate 20 (lower polarizing layer) and a reflecting polarizing plate 21 are disposed in this order. A transparent axis of the lower polarizing plate 20 and a transparent axis of the reflecting polarizing plate 21 are disposed so as to be almost parallel to each other.

Near internal surface of the upper substrate 3 made of glass and resin, color filters 11 such as those of red, green, and blue extend in directions orthogonal to the surface of drawing so as to be orthogonal to the electrode 8 of the lower substrate 2 in such an order and in a repeated manner, and a flattening layer 12 for flattening bumps formed by the color filter 11 is layered thereon. On the flattening layer 12, an electrode 14 in stripe form made of a transparent conductive layer such as one of ITO extends in a direction orthogonal to the surface of drawing, and an orientation layer 15 made of polyimide is layered on the electrode 14. Also, near an outer surface of the upper substrate 3, a forward scattering plate 16, a phase differentiating plate 17, and an upper polarizing plate 13 are layered in that order. Near a bottom surface of the backlight 5 (in opposite side of the liquid crystal panel 1), a reflecting plate 18 is disposed.

Figure 9:
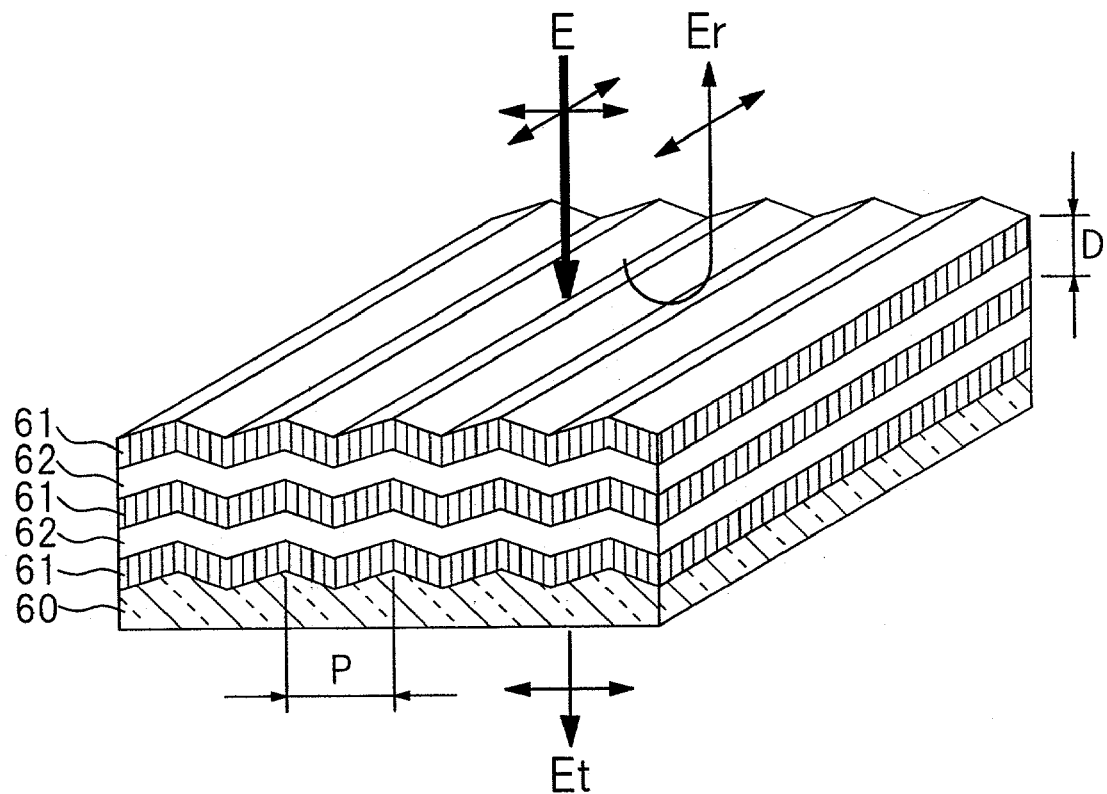
FIG. 9 is a perspective view showing an example of the lower reflecting polarizing layer of the liquid crystal display device of the present invention.

A lower reflecting polarizing layer 6 is explained with reference to FIG. 9 as follows. FIG. 9 is a perspective view showing an example of reflecting polarizing layer made by layering dielectric interference layer having prismatic structure. A reflecting polarizing layer 6 of FIG. 9 is formed by layering a plurality of Si layer 61, a $SiO_2$ layer 62 or $SiO_2$ 61, and a layer 62 made of $TiO_2$, $Ta_2O_5$ or the like alternately. A reflecting layer 6 of FIG. 9 is what is called a three dimensional photonic crystal layer. Such photonic crystal made by layering layers having prismatic structure has anisotropy in light transmission characteristics. When a light is incident from above in the drawing, a light component which is orthogonal to a groove of the substrate 2 transmits through the photonic crystal, and a light component which is parallel with the above groove is reflected. That is, a light Et which transmits through the reflecting polarizing layer shown in FIG. 9 becomes a polarized light which is orthogonal to the groove of the substrate 2, and a light Er which is reflected becomes a polarized light which is parallel with the above groove. In addition, layer pitch D in layers 1 and 62 is nearly 0.1 $\mu$m, and a pitch P of the groove which is formed on the substrate 2 is nearly 3 to 5 $\mu$m.

Also, light transmission ratio of the reflecting polarizing layer 6 shown in FIG. 9 can be controlled by changing the number of layer of the above dielectric interference layer. That is, when the number of the layer of the dielectric interference layer increases, light transmission ratio of the reflecting polarizing layer decrease, and reflection ratio increases. Therefore, a reflecting polarizing layer having necessary light transmission ration can be formed by controlling the number of the layer. Although the relationship between the transmission ratio and the number of layers is not limited to a specific ratio, when the number of the layer is 8 to 12 layers, light transmission ratio becomes 30% (reflecting ratio: 70%). In addition, if a reflecting polarizing layer 6 shown in FIG. 9 is applied to a third embodiment of a liquid crystal display device which is mentioned later, reflection ratio of the polarized light which is parallel with the reflecting axis is adjusted so as to be 100%.

The direction of the groove 60 as shown in FIG. 9 is almost parallel to a transparent axis of the lower polarizing plate 20. That is, a transparent axis of the lower reflecting polarizing layer 6 and a transparent axis of the lower polarizing plate 20 are disposed so as to almost cross orthogonally. By doing this, the light which is transmitted through the lower reflective polarizing layer 6 can be absorbed by the lower polarizing plate 20 effectively in reflection mode, dark display can be darker in a reflection mode, and the contrast of the liquid crystal display device can be improved.

Also, balance of brightness between transparent mode and reflection mode can be set arbitrarily by adjusting the number of the layer of the reflective polarizing layer 6. For example, when the brightness in transparent mode is preferred, the number of the layers of the lower reflective polarizing layer 6 may be decreased so as to enhance the transparency of the lower reflective polarizing layer 6.

In a liquid crystal display device having the above basic structure in the present embodiment, the lower reflective polarizing layer 6 is formed on an inner surface of the lower substrate 2, and a ¼ wavelength plate which is conventionally used be disposed near an outer surface of the lower substrate may be omitted. According to such a structure, in a liquid crystal display device in this embodiment, displaying operation with superior visibility is possible in both reflection mode and transparent mode. In particular, because a ¼ wavelength plate is not disposed near an outer surface of the lower substrate 2, the light which is reflected at a back side surface of the lower reflective polarizing layer 6 and returns to the backlight 5 among the light which returns to a backlight 5 can be reflected by the reflection plate 18 and returned to the liquid crystal panel 1 again. According to such a structure, the light from the backlight 5 can be used for the display operation effectively; thus, the brightness of the display can be remarkably enhanced to a degree greater than in a conventional structure. Above effect is explained in detail with reference to FIGS. 5 and 6.

Figure 5A:
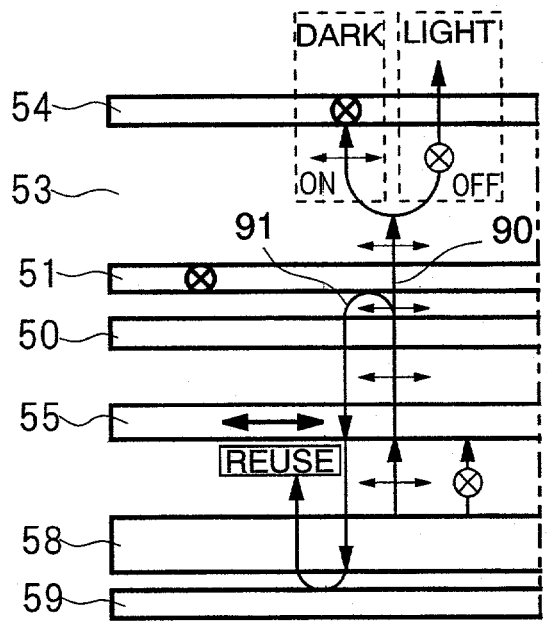
FIGS. 5A and 5B are view for explaining the operation of a liquid crystal display device of the present invention.
Figure 5B:
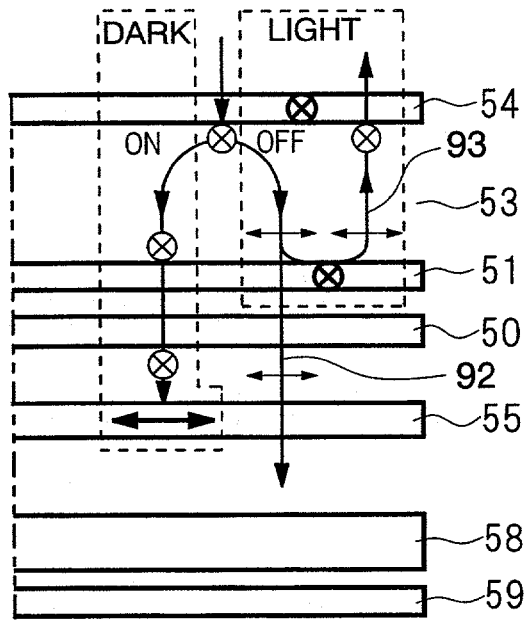

FIGS. 5A and 5B are views for explaining operation of a liquid crystal display device of the present invention. FIG. 5A shows light paths in a transparent mode and FIG. 5B shows light paths in a reflection mode. These drawings show only necessary structures for the explanation of the present embodiment. Liquid crystals 53 are put between an upper polarizing plate 54 and a lower reflecting polarizing plate 51. A lower substrate 50 is disposed on an outer surface of the lower reflecting polarizing plate 51. A lower polarizing layer 55 is formed on an outer surface of the lower substrate 50. A lighting device 58 is disposed beneath the lower polarizing layer 55, and a reflecting plate 59 is disposed on an outer surface of the lighting device 58.

The upper polarizing plate 54 has a transparent axis in orthogonal direction to the surface of the drawing, and the lower polarizing layer 55 has a transparent axis which is parallel with the surface of the drawing. Also, the lower reflecting polarizing layer 51 is a transflective reflective type reflecting polarizing layer, and has a transparent axis in an orthogonal direction to the surface of the drawing and a reflecting axis which crosses orthogonally with the transparent axis. The lower reflecting polarizing layer 51 lets almost all of the light which is parallel with the transparent axis transmit through, and reflects a part of the light which is parallel with the reflecting axis and lets a part of the light which is parallel with the reflecting axis be transmitted therethrough. That is, the lower reflecting polarizing layer 51 has a transflective reflectivity to light which is parallel with the reflecting axis.

A case of displaying operation in a transparent mode shown in FIG. 5A is explained as follows.

In a liquid crystal display device of the present invention, a display operation in a transparent mode is performed by using light which is emitted from the lighting device 58. The light which is emitted from the lighting device 58 is converted to a polarized light which is parallel with the surface of the drawing by a lower polarizing layer 55 having a transparent axis which is parallel with the surface of the drawing, and the polarized light is transmitted through the lower substrate 50 and becomes incident to the lower reflecting polarizing layer 51. The lower reflecting polarizing layer 51 has a transparent axis which is orthogonal to the surface of the drawing as mentioned above. A part of the light which is parallel with the surface of the drawing and is polarized by the lower polarizing layer 55 is reflected so as to become a reflected light 91 which returns to a near side of the lighting device 58, and a part of the light is made a transmitted light 90 which is incident on the liquid crystals 53.

Next, as long as electricity is charged to the liquid crystals 53 (on-state), the transmitted light 90 which is incident to the liquid crystals 53 reaches to the upper polarizing plate 54 without being influenced by the liquid crystal 53, and is absorbed by the upper polarizing plate 54 having a transparent axis which is orthogonal to a surface of drawing; then, the dark display of the pixels are performed. On the other hand, as long as electricity is not charged to the liquid crystals 53 (off-state), the transmitted light 90 which is incident on the liquid crystals 53 is converted to a polarized light which is orthogonal to the surface of the drawing by a rotary polarization effect of the liquid crystals 53 and reaches to an upper polarizing plate 54. This light is a polarized light and is parallel with a transparent axis of the upper polarizing plate 54 and is transmitted through the upper polarizing plate 54; thus, the light display of the pixels is performed.

Here, the reflected light 90 which is reflected at a back side (beneath the lower substrate 50) of the lower reflecting polarizing layer 51 is transmitted through the lower substrate 50 and the lower polarizing layer 55 and returns to the lighting device 58 and is reflected by a reflecting plate 59 which is on an outer surface of the lighting device 58, and is then re-used as a light which runs to the lower polarizing layer 55 again. The re-used light reaches to the reflecting polarizing layer 51 again. A part of the re-used light is transmitted therethrough and is incident on the liquid crystals 53, and a part of the re-used light is reflected and returns back to the near side of the lighting device 58. In this way, the light which is reflected by the lower reflecting polarizing layer 51 is transmitted through the lower reflecting polarizing layer 51 while repeating reflection between the lower reflecting polarizing layer 51 and the reflecting plate 59 and is used as a light which contributes to a display operation. Thus, in a liquid crystal display device of the present invention, among the lights which are emitted from the lighting device 58, the light which is transmitted through the lower polarizing layer 55 can be used maximally; therefore, bright display can be obtained.

Next, a case of displaying operation in reflection mode as shown in FIG. 5B is explained as follows. A light which is incident from above the upper polarizing plate 54 is converted to a polarized light which is parallel with the surface of the drawing by an upper polarizing plate 54 having a transparent axis which is orthogonal to the surface of the drawing and is incident to the liquid crystals 53. Next, if the liquid crystal is in the on-state, the incident light reaches to the lower reflecting polarizing layer 51 with very little influence by the liquid crystals 53. The lower reflecting polarizing layer 51 has a transparent axis which is orthogonal to the surface of the drawing and a reflecting axis which is parallel with the surface of the drawing; thus, the light which reaches to the lower reflecting polarizing layer 51 is transmitted through the lower reflecting polarizing layer 51. After that, the light is transmitted through the lower substrate 50 and is absorbed by the lower polarizing layer 55 having a transparent axis which is parallel with the surface of the drawing; then; the dark display of the pixels is performed.

On the other hand, if the liquid crystals 53 is in the off-state, the light which is incident on the liquid crystals 53 is converted to a polarized light which is parallel with the surface of the drawing by a rotary polarization of the liquid crystals 53 and reaches the lower reflecting polarizing layer 51. A part of the polarized light is reflected by the lower reflecting polarizing layer 51 having a reflecting axis which is parallel with the surface of the drawing so as to be a reflected light 93, and a part of the polarized light is transmitted therethrough so as to be a transmitted light 92. The reflected light 93 is converted to a polarized light which is orthogonal to the surface of the drawing again by a rotary polarization of the liquid crystals 53 and is transmitted through the upper polarizing plate 54; thus, the light display of the pixels is performed. Also, the transmitted light 92 which is transmitted through the lower reflecting polarizing layer 51 is transmitted through the lower substrate 50 and the lower polarizing layer 55 and is emitted to the lighting device 58. A reflecting plate 59 is disposed on the lighting device 58; therefore, a part of the transmitted light 92 is reflected by the reflecting plate 59 and returns to the lower substrate 50. When this light is incident on the liquid crystals 53, the pixels which is displayed in light display becomes brighter.

Figure 12:
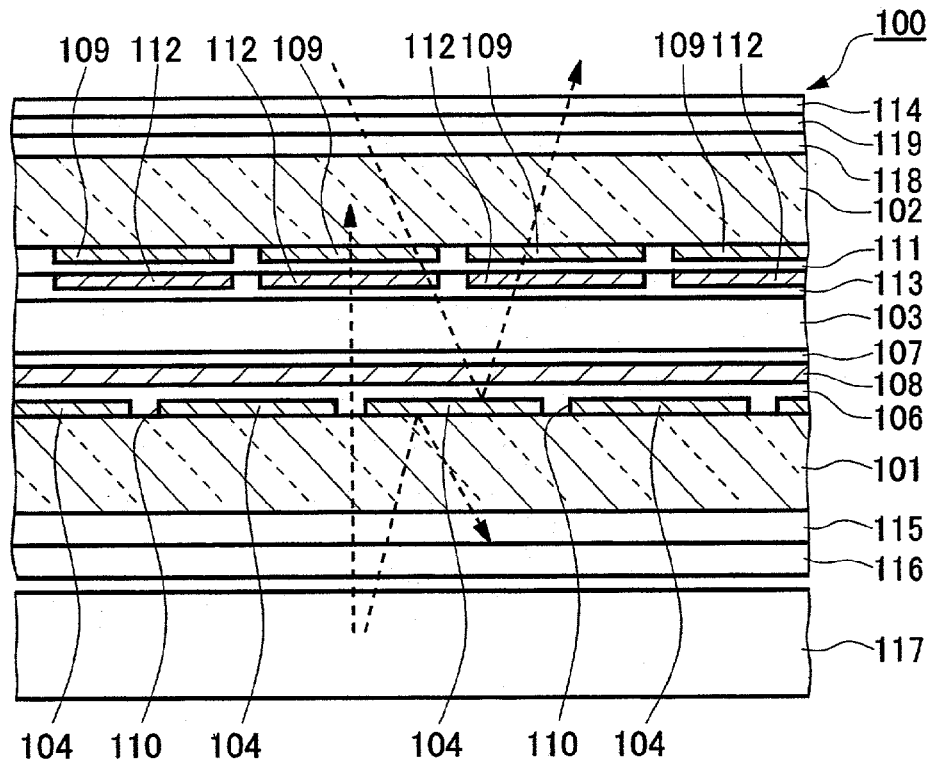
FIG. 12 is a cross section showing a part of an example of the conventional liquid crystal display device.

As described above, in a liquid crystal display device of the present invention, display operation is possible without providing a ¼ wavelength plate on an outer surface of the lower substrate 101 of the liquid crystal display device 100 as shown in FIG. 12. Therefore, there occurs no conversion from linear polarization to circular polarization or from circular polarization to linear polarization; thus, the light is not lost due to such conversion. Thus, brighter display can be obtained, and the brightness in transparent mode can be improved to a great extent.

Figure 13:
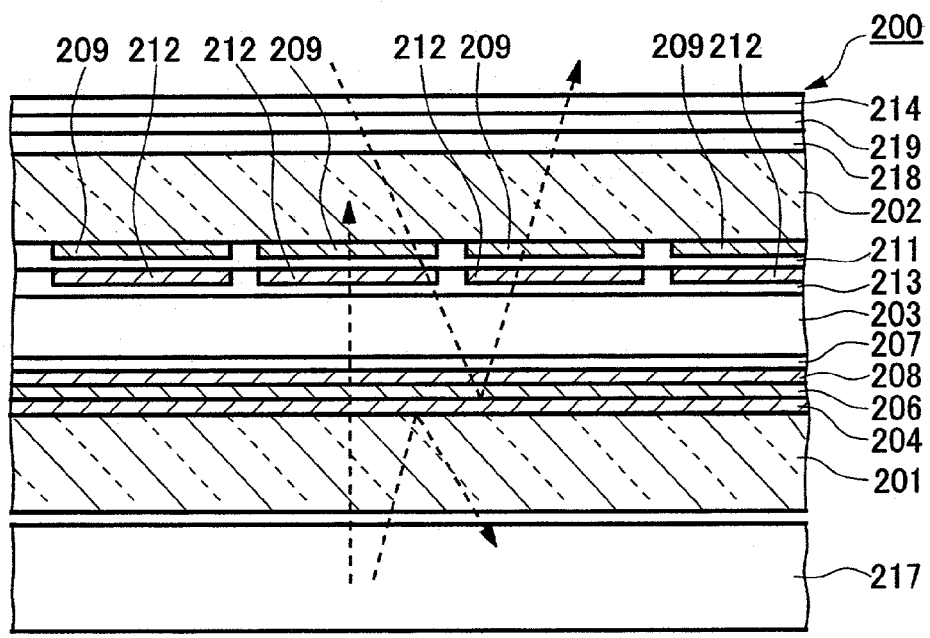
FIG. 13 is a cross section showing a part of other example of the conventional liquid crystal display device.

Next, the operation of the liquid crystal display device 200 having a conventional structure as shown in FIG. 13 is explained with reference to FIG. 6.

FIG. 6 is a view for explaining the operation of the above liquid crystal display device 200. In FIG. 6, only necessary structures are shown among the structures of FIG. 13. That is, liquid crystals 203, upper polarizing plate 214, reflecting polarizing layer 204, lower substrate 201, and backlight 217 disposed on outer surface of the lower substrate 201 are shown.

Figure 6A:
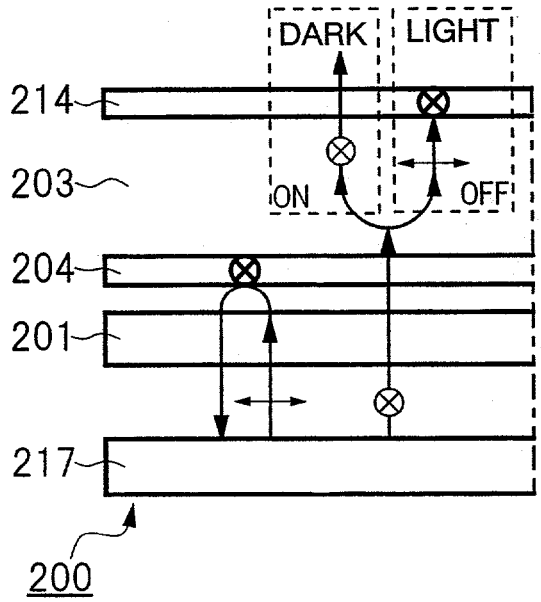
FIGS. 6A and 6B are views for explaining the operating theory of the liquid crystal display device of FIG. 13.

First, the transparent mode shown in FIG. 6A is explained.

In a liquid crystal display device 200, a light which is emitted from the back light 217 (lighting device) is transmitted through the lower substrate 201 and reaches the lower reflecting polarizing layer 204. The lower reflecting polarizing layer 204 has a transparent axis which is orthogonal to the surface of the drawing and a reflecting axis which is parallel with the surface of the drawing, and a part of a light which reaches the lower reflecting polarizing layer 204 is converted to a polarized light which is orthogonal to the surface of the drawing and is incident on the liquid crystals 203. If the liquid crystal 203 is in an on-state, the incident light reaches to the upper polarizing plate 214 with little influence by the liquid crystal 203 and is transmitted through the upper polarizing plate 214 having a transparent axis which is orthogonal to the surface of the drawing. Thus, bright display of the pixel is performed. On the other hand, if the liquid crystal 203 is in an off-state, a light which is incident to the liquid crystal 203 is converted to a polarized light which is parallel with the surface of the drawing by a rotary polarization of the liquid crystal 203 and reaches to the upper polarizing plate 54 and is absorbed by the upper polarizing plate 54 having a transparent axis which is orthogonal to the surface of the drawing. In this way, dark display of pixels is performed.

Figure 6B:
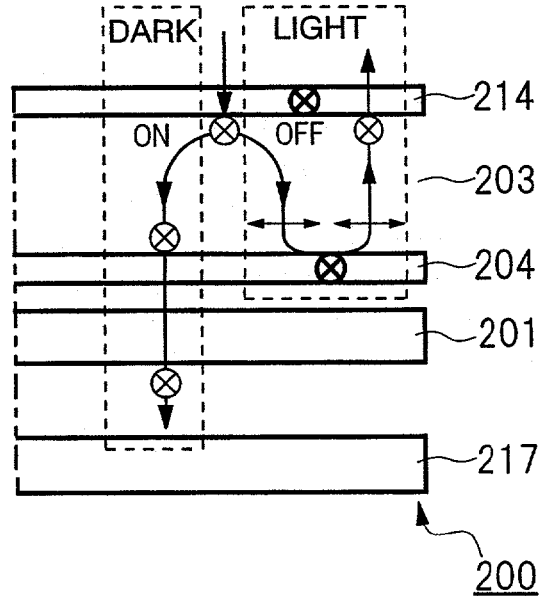

Next, reflection mode shown in FIG. 6B is explained.

As shown in FIG. 6B, a light which is incident from above the upper polarizing plate 214 is converted to a polarized light which is orthogonal to the surface of the drawing by the upper polarizing plate 214 having a transparent axis which is orthogonal to the surface of the drawing and is incident to the liquid crystal 203. If the liquid crystal 203 is in the on-state, the incident light reaches to the reflecting polarizing plate 204 and is transmitted through the reflecting polarizing plate 204 having a transparent axis which is orthogonal to the surface of the drawing and is transmitted through the lower substrate 201 and is emitted to a near side of a backlight 217. In this way, dark display of the pixels is performed. On the other hand, if the liquid crystal is in an off-state, the light which is incident on the liquid crystal 203 is converted to a polarized light which is parallel with the surface of the drawing by a rotary polarization of the liquid crystal 203 and reaches the reflecting polarizing plate 204. Here, the reflecting polarizing plate 204 has a transparent axis which is parallel with the surface of the drawing; thus, the polarized light is reflected and is incident on the liquid crystal 203 again. The incident light is converted to a polarized light which is orthogonal to the surface of the drawing by a rotary polarization of the liquid crystal 203 and is transmitted through the upper polarizing plate 214. In this way, bright display of the pixels is performed.

In a liquid crystal display device 200, there is a problem in that the contrast of the display decreases to a great extent if an external light is incident on the liquid crystal display device 200 in a transparent mode. This is caused because the on/off state corresponding to light display and dark display of the liquid crystal 203 is different. That is, when dark display of the pixels is performed, the liquid crystal is in an off-state in a transparent mode, and the liquid crystal is in an on-mode in a reflection mode. Therefore, during the transparent mode, an external light which is incident to pixels of dark display (pixels which no electricity is impressed on liquid crystal) is reflected on an upper surface of the reflecting polarizing layer 204 and is transmitted through the upper substrate 201 and is emitted to above the liquid crystal display device 200. Thus, pixels are displayed in bright display and the contrast decreases so much that the display becomes invisible.

As above explained, according to a liquid crystal display device of the present invention, a light which is emitted from the lighting device can be used effectively as comparing to a conventional semi-transmitting reflecting liquid crystal display device; thus, the brightness of the display in transparent mode can be improved remarkably. Also, on/off state of the liquid crystal corresponding to bright/dark display is equalized both in transparent mode and reflection mode, when a light coming from outside in transparent mode, the contrast of the display does not decrease; thus, the vivid display can be obtained. Furthermore, a light which transmits through the liquid crystal is absorbed by a lower polarizing layer in dark display in reflecting mode; thus, dark display can be darker, and the contrast in reflecting mode can be improved.

In a liquid crystal display device of the present embodiment, a reflecting polarizing plate 21 is disposed on outer surface of the lower polarizing plate 20; thus, absorption of light by the lower polarizing plate 20 hardly occur. Therefore, a light from the backlight 5 can be used effectively for display operation, and display operation of the liquid crystal can be superior in brightness of the transparent mode. The function of the reflecting polarizing plate 21 is explained in detail with reference to FIGS. 7A and 7B. A liquid crystal display device shown in these drawings made by disposing a reflecting polarizing plate on an outer surface of the lower substrate of a liquid crystal display device shown in FIG. 5.

Figure 7:
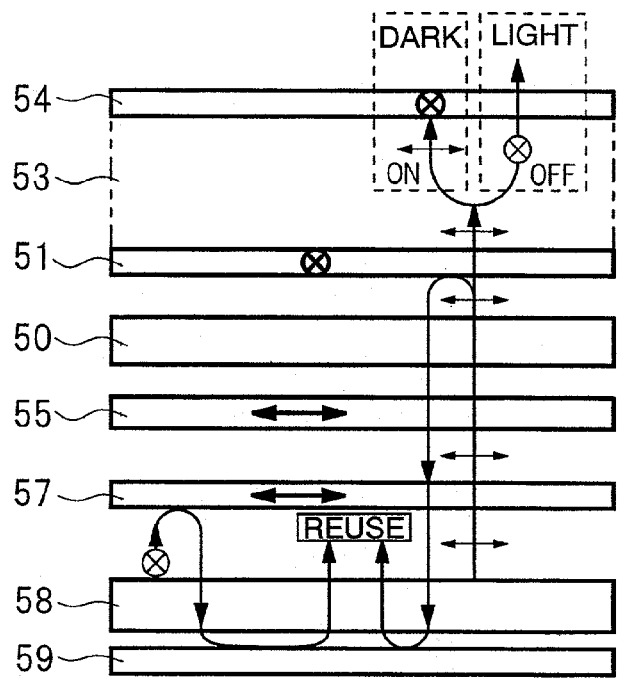
FIGS. 7 is a view for explaining the operating theory of other structures of the present invention.

FIG. 7 is a view for explaining important section of the liquid crystal display device according to the present invention employing above structure. A liquid crystal display device shown in these drawings are made by disposing a reflecting polarizing plate on an outer surface of the lower substrate of the liquid crystal display device shown in FIGS. 5A and 5B. As below, only a function of a reflecting polarizing plate 57 shown in FIGS. 7A and 7B is explained in detail. The same reference numerals as FIGS. 5A and 5B are attached to items shown in FIGS. 7A and 7B so as to omit the explanations thereof.

A reflecting polarizing plate 57 shown in FIG. 7 has a transparent axis which is parallel with the surface of the drawing and a reflecting axis which is orthogonal to the surface of the drawing. Display theory in this liquid crystal display device is almost the same as the transparent mode of the liquid crystal display device shown in FIGS. 7A and 7B, and among the light which is emitted from the lighting device 58, only a polarized component which is parallel with the surface of the paper is transmitted by a reflecting polarizing plate 57 having a transparent axis which is parallel with the surface of the drawing, and is transmitted through the lower polarizing layer 55 and the lower substrate 50. A part of the light is transmitted through the lower reflecting polarizing layer and is incident on the liquid crystal 53. Here, if the liquid crystal is in an on-state, the incident light reaches to the upper polarizing plate 54 and is absorbed by an upper polarizing plate having a transparent axis which is orthogonal to the surface of the drawing, and the dark display of pixels is performed. If the liquid crystal 53 is in an off-state, the incident light is converted to a polarized light which is orthogonal to the surface of the drawing by a rotary polarization of the liquid crystal 53 and is transmitted through the upper polarizing plate 54. Light display of the pixels is performed in this way.

A liquid crystal display device shown in FIGS. 7A and 7B is provided with a reflecting polarizing plate 57; thus, brighter display can be obtained than the liquid crystal display device shown in FIGS. 5A and 5B. This is because, in a liquid crystal display device shown in FIGS. 5A and 5B, almost half the amount of the light emitted from the lighting device 58 is absorbed by the lower polarizing layer 55, in contrast, in the liquid crystal display device shown in FIGS. 7A and 7B, there occurs no absorption of the light by the lower polarizing layer 55.

That is, because the reflecting polarizing layer 57 is disposed, among the light which is emitted from the lighting device 58, the component of the light which is not parallel with a transparent axis (parallel with a surface of drawing) of the reflecting polarizing plate 57 is reflected by the reflecting polarizing plate 57 and returns to the lighting device 58. Because this light is reflected by the reflecting plate 59 which is disposed near an outer surface of the lighting device 58; thus, this light is reflected between the reflecting polarizing plate 57 and the reflecting plate 59. While this reflection is repeated, the state of polarization changes, and a part of the light is transmitted through the reflecting polarizing plate 57. Therefore, when the light which is transmitted through the reflecting polarizing plate 57 is transmitted through the lower reflecting polarizing plate 51, this light contributes to the display operation.

Also, among the light which is transmitted through the reflecting polarizing plate 57, because the light which is reflected on bottom surface of the reflecting polarizing layer 51 is reflected by the reflecting plate 59 and returns to the lower reflecting polarizing layer 51. While such reflection is repeated, the light which is reflected on bottom surface of the reflecting polarizing layer 51 transmits the lower reflecting polarizing layer 51 and is incident to the liquid crystal 53; thus, the light can be used for the display operation. Therefore, the amount of light which is transmitted through the lower reflecting polarizing layer 51 and is incident to the liquid crystal 53 increases; thus, the brightness of the display in transparent mode can be improved.

Here, an angle formed by a transparent axis of the lower polarizing plate 20 and a transparent axis of the reflecting polarizing plate 21 should preferably be in the range of −30 degrees to +30 degrees. In a liquid crystal display device shown in FIG. 1, among the light which is transmitted through the reflecting polarizing plate 21, a light component which is not parallel with a transparent axis of the lower polarizing plate 20 is absorbed by the lower polarizing plate 20; thus, it is certainly most preferable that the angle made by a transparent axis of the lower polarizing plate and a transparent axis of the reflecting polarizing plate 21 be 0 (zero) degree (both transparent axes are parallel). If the angle made by both transparent axes is in the range of ±30 degrees, practical use is possible. The angle made by both transparent axes exceeds such a range, the amount of the light which is absorbed by the lower polarizing plate 20 increases, the amount of light which is absorbed by the lower polarizing plate 20 increases; thus, the effect for making display to be brighter can not be obtained.

Also, in a liquid crystal display device of the present embodiment, it is preferable that transparency of the light which is parallel with a reflection axis of the lower reflecting polarizing layer 6 be between 20% and 70%, and it is more preferable that the transparency be between 30% and 50%. By making the reflection ration of the above transflective reflecting lower reflecting polarizing layer 6 to be in the above-mentioned range, a liquid crystal display device which can obtain bright display both in transparent mode and reflection mode with superior visibility.

If the above transparency is less than 20%, the amount of light which is incident on the liquid crystal from the back light 5 is too small, brightness of the display in a transparent mode is insufficient. If the above transparency is greater than 70%, the incident light is reflected by the lower reflecting polarizing layer 6 in a reflection mode and the amount of light for display is insufficient. Thus, by making the transparency within a range between 30% to 50%, the balance of the brightness in both transparent mode and reflection mode can be favorable and a liquid crystal display device having superior visibility can be obtained.

Next, in a liquid crystal display device of the present invention, it is preferable that a transparent axis of the lower reflecting polarizing layer and a transparent axis of the lower polarizing layer be nearly orthogonal. By doing this way, almost all of light which transmits through the reflecting polarizing layer can be absorbed by the lower polarizing layer when dark display of reflection mode is performed; thus, dark display can be darker and the contrast of the display can be improved.

Also, in a liquid crystal display device of the present invention, it is preferable that an angle made by transparent axis of the lower reflecting polarizing layer 6 and a transparent axis of the lower polarizing plate 20 be in the range of 60 degrees and 120 degrees.

In a reflection mode as shown in FIG. 5B, when dark display is performed, a light coming from outside and incident to the liquid crystal display device is absorbed by the lower polarizing layer 55 finally. Among the light which transmits through the lower reflecting polarizing layer 51, a light component which is parallel with the transparent axis of the lower polarizing layer 55 transmits through the lower polarizing layer 55 and is emitted to near side of the lighting device 58. When this light is reflected by the reflecting plate 59 and returns to the liquid crystal 53, dark display becomes light; thus, the contrast of the display decreases. Therefore, in a liquid crystal display device as shown in FIG. 1, it is most preferable that an angle made by a transparent axis of the lower polarizing plate 20 (lower polarizing layer 55 in FIGS. 5A and 5B) and a transparent axis of the lower reflecting polarizing layer 6 (lower reflecting polarizing layer 51 in FIGS. 5A and 5B) be 90 degrees (orthogonal). As long as an angle made by both transparent axes is in the range of ±30 degrees, practical use is possible. If an angle made by both transparent axes exceeds such range, the amount of the light which transmits the lower polarizing plate 20 increases; thus, the contrast of the liquid crystal display device decreases.

Also, in a liquid crystal display device of the present embodiment, a forward scattering plate as a scattering plate is disposed on an outer surface of the upper substrate 3. Such a scattering plate can be obtained by forming a layer having light scattering function directly on the lower reflecting polarizing layer 6 or on an inner surface of the upper substrate 3.

Second Embodiment

Figure 2:
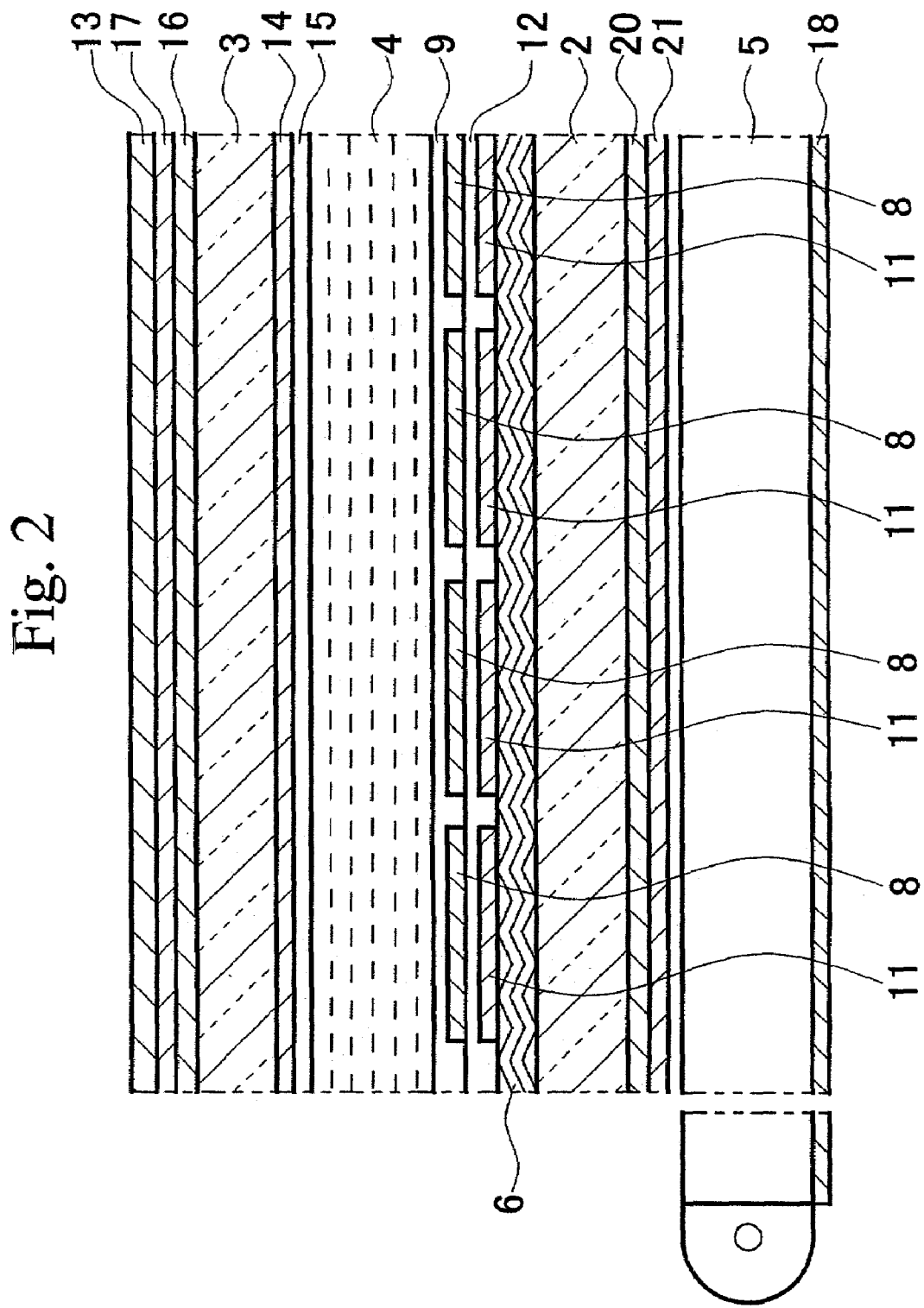
FIG. 2 is a cross section showing a part of a liquid crystal display device of the second embodiment of the present invention.

In this embodiment, the overall structure of the liquid crystal display device is similar to that of the first embodiment as shown in FIG. 1, and detailed explanation is omitted. The liquid crystal display device of the present embodiment is different from the liquid crystal display device of the first embodiment in that the color filter 11 is layered directly on the lower reflective polarizing layer 6 and the flattening layer 12 for flattening the bumps on the color filter 11 is disposed on the color filter 11. In the present embodiment, explanation is made only on this point with reference to FIG. 2. FIG. 2 is a view showing a part of cross section of the liquid crystal display device of the present embodiment. In FIG. 2, the same reference numerals are added to structures which are the same as in FIG. 1.

In the liquid crystal display device of the present embodiment as shown in FIG. 2, color smearing and parallax can be decreased in a reflection mode by disposing a color filter 11 on the lower reflective polarizing layer 6. This is because the light is transmitted one pixel layer (for example a red pixel layer) and is reflected by the lower reflective polarizing layer 6 and is transmitted through the same pixel layer again by disposing the color filter 11 directly on the lower reflective polarizing layer 6.

Third Embodiment

Figure 3:
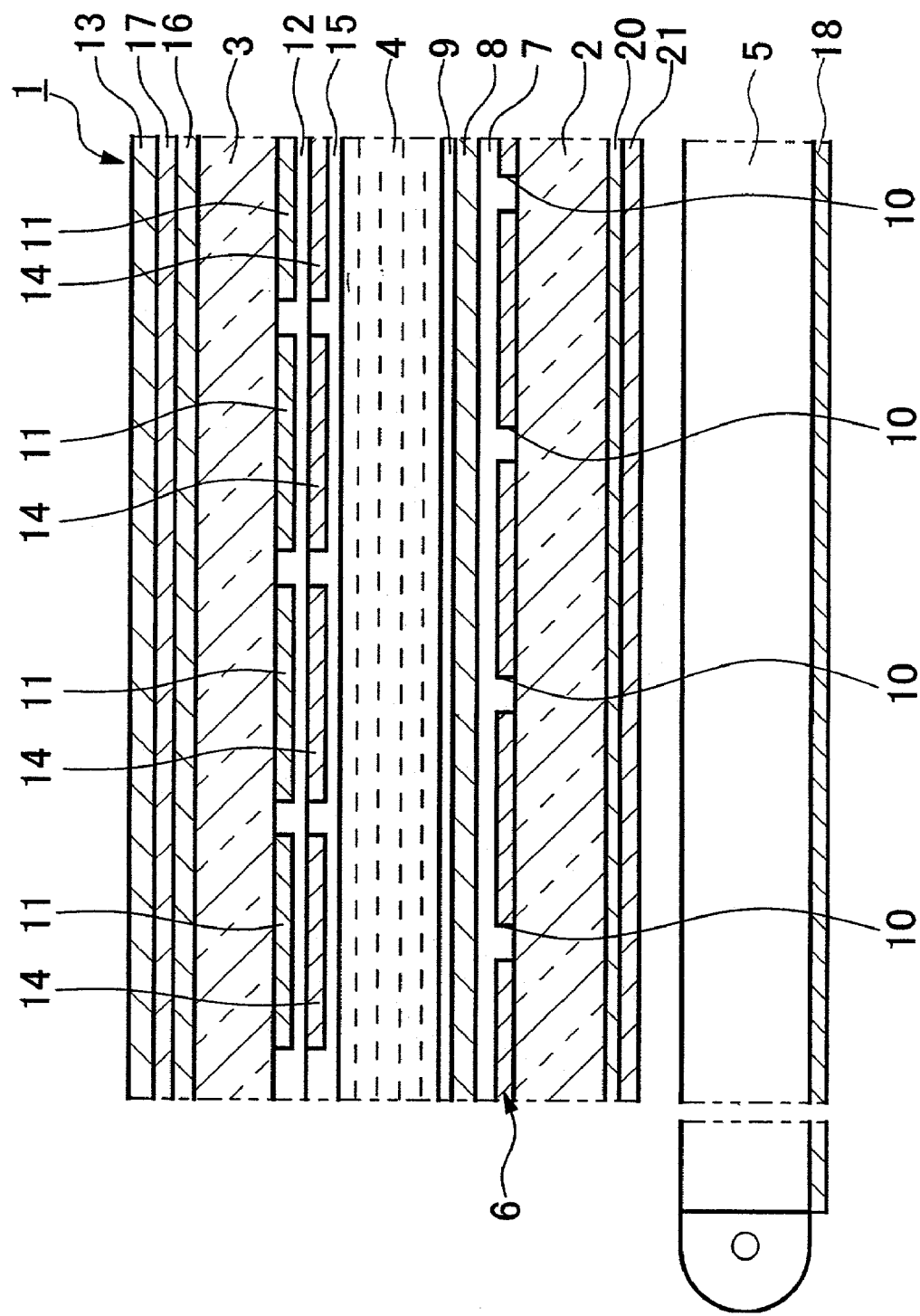
FIG. 3 is a cross section showing a part of a liquid crystal display device of the third embodiment of the present invention.

FIG. 3 is a view showing a part of a cross section of the liquid crystal display device of the present embodiment. The present embodiment is an example of a passive matrix type transflective reflective color liquid crystal display device. In the following drawings, the same reference numerals are added to structures which are the same as in FIG. 1.

A liquid crystal display device of the present embodiment is generally constructed, as shown in FIG. 3, by a liquid crystal 4 made by disposing a lower substrate 2 and an upper substrate 3 so as to face each other, and disposing liquid crystal 4 made of STN (Super Twisted Nematic) liquid crystal in a space between the substrates 2 and 3, and a backlight 5 (lighting device) which is disposed near the back side of the liquid crystal panel 30 (near the outer surface of the lower substrate 2).

Near the internal surface of the lower substrate 2 made of glass and resin, the lower reflecting polarizing layer 36 having plural fine slits on metal reflecting layer, and an insulating layer (flattening layer) 7 are successively layered. A scanning electrode 8 having stripe structure made of transparent conductive layer such as ITO extends in horizontal direction in drawing on this insulating layer 7. Orientation layer 9 made of Polyimide or the like is layered thereon so as to cover the scanning electrode 8. Also, slits (opening section) 10 for transmitting a light emitted from the back light 5 are disposed to each pixels on the lower reflecting polarizing layer 36. Also, a lower polarizing plate 20 and a reflecting polarizing plate 21 are disposed in this order on an outer surface of the lower substrate 2. A transparent axis of the lower polarizing plate 20 and a transparent axis of the reflecting polarizing plate 21 are disposed so as to be parallel.

Figure 10:
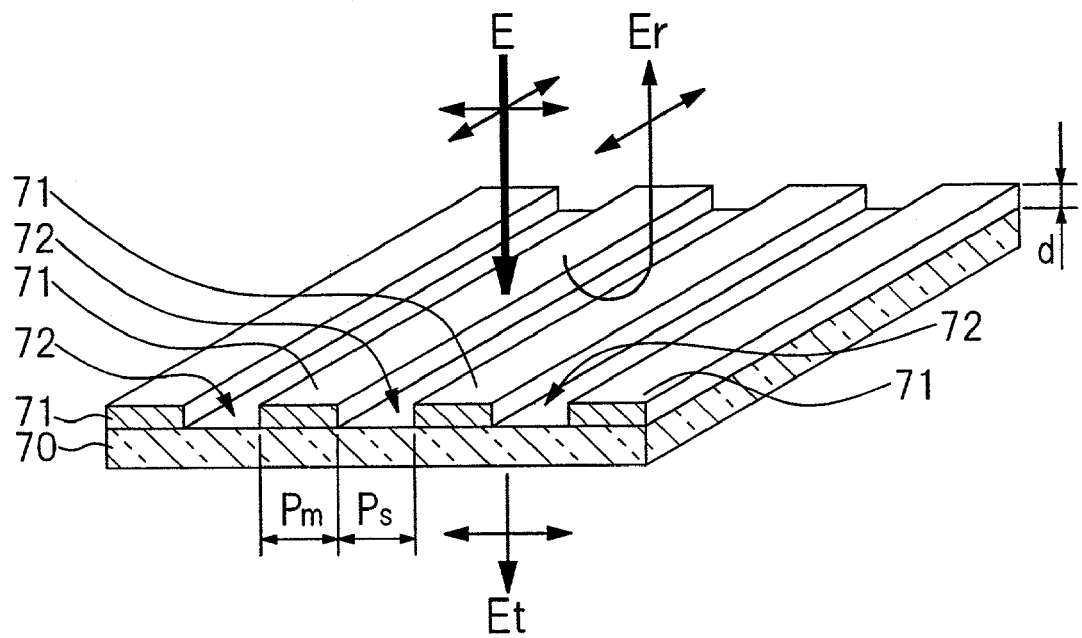
FIG. 10 is a perspective view showing other example of the lower reflecting polarizing layer of the liquid crystal display device of the present invention.

A lower reflecting polarizing layer 36 according to the present invention is disposed as shown in FIG. 10. A lower reflecting polarizing layer 36 shown in FIG. 10 is made by forming a plurality of slit 72 in predetermined pitch on highly reflective metal reflecting layer 71 such as aluminum and silver which is formed on the substrate 2. A plurality of slit 72 are parallel each other, and width of slits Ps is equal among each slit 72. Although each dimension is not limited to specific dimension, the thickness d of the metal reflecting layer 71 is nearly 20 to 400 nm. The width Ps of the slits 72 is 30 to 300 nm. The width Pm of one metal reflecting layer 71 is 30 to 300 nm. A metal reflecting layer 71 of the reflecting polarizing layer 26 shown in FIG. 10 is layered thick so as to reflect light which is parallel with the reflecting axis by 100%.

In a lower reflecting polarizing layer 36 having such structure, when light coming from above is incident, a light component which is parallel in longitudinal direction of the slit 72 is reflected, and a light component which is orthogonal to the longitudinal direction of the slit 72 is transmitted. That is, the light Et which transmits through the lower reflecting polarizing layer 26 as shown in FIG. 10 becomes a polarized light which is orthogonal to the slit 72. The light Er which is reflected by the lower reflecting polarizing layer 36 becomes a polarized light which is parallel with the slit 72.

In addition, when a reflecting polarizing layer as shown in FIG. 10 is used as a reflective polarizing layer having transflective reflective property such as the lower reflecting polarizing layer as shown in FIG. 5, the light transmission ratio can be controlled by changing the thickness of the layer of the metal reflecting layer. That is, when the thickness of the metal reflecting layer increases, the light transmission ratio of the reflecting polarizing layer decreases; thus, the reflection ratio increases. Accordingly, a reflecting polarizing layer having required light transmission ratio can be obtained by controlling the thickness of the layer. The relationship between the transmission ratio and the thickness of the layer is not limited specifically. When the thickness of the layer is 20 to 40 nm, the light transmission ratio becomes 30% (reflection ratio 70%).

On the other hand, on an inner surface of the upper substrate 3 made of glass and resin, color filters 11 such as red, green, and blue extends in orthogonal direction of the drawing so as to be orthogonal to the scanning electrode 8 of the lower substrate 2, and such disposition repeats in such order. A flattened layer 12 is layered thereon for flattening the gaps formed by color filters 11. On a flattened layer 12, stripe signal electrode 14 made of a transparent conductive layer such as ITO extends in an orthogonal direction in the drawing. An orientation layer 15 made of polyimide is layered on the scanning electrode 14. Also, on an outer surface of the upper substrate 3, a forward scattering plate 16 and a phase difference plate 17, and an upper polarizing plate 13 are layered on the upper substrate 3 in such order. On an outer surface of the back light 5 (opposite surface of the liquid crystal panel 1), an reflecting plate 18 is disposed.

The lower reflecting polarizing layer 36 is made by forming plural fine slit opening sections having 30 to 300 nm width in parallel on a metal layer made of aluminum or silver as shown in FIG. 10. The direction of the slit opening section is nearly parallel with a transparent axis of the lower polarizing plate 20. That is, a transparent axis of the lower reflecting polarizing layer 36 and a transparent axis of the lower polarizing plate 20 are disposed so as to be orthogonal. By doing this way, the light which transmits through the lower reflecting polarizing layer 36 in reflection mode can be absorbed by the lower polarizing plate 20 effectively; thus, dark display in reflection mode can be darker, and the contrast of the liquid crystal display device can be improved.

An liquid crystal display device of the present invention having above basic structure has a lower reflecting polarizing layer 36 on an inner surface of the lower substrate 2, and a ¼ wavelength plate which was necessary to be disposed on an outer surface of the conventional lower substrate is omitted. By doing this way, a liquid crystal display device of the present embodiment has superior visibility in display operation in reflection mode and in transparent mode. Particularly, in transparent mode, a ¼ wavelength plate is not disposed on an outer surface of the lower substrate 2, among the light which is emitted from the back light 5, the light which is reflected on a back surface of the lower reflecting polarizing layer 36 and returns to the back light 5 can be reflected by the reflecting plate 18 and returned back again to the liquid crystal panel 30. Accordingly, the light from the back light 5 can be used for the display operation effectively; thus, the brightness can be remarkably improved than conventional display device. The effect of such structure is explained in detail with reference to FIG. 8 as follows.

Figure 8A:
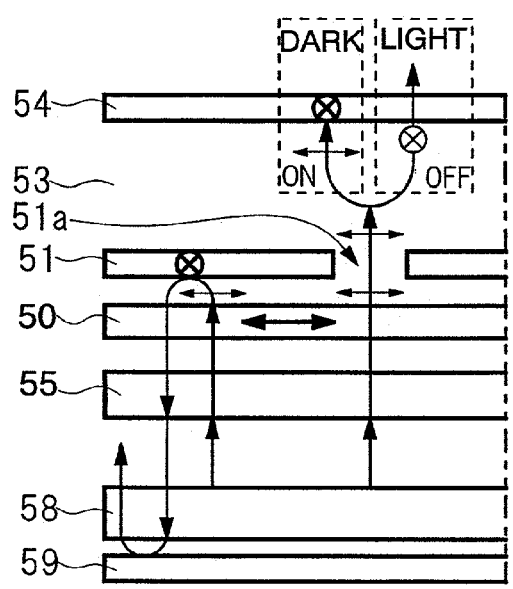
FIGS. 8A and 8B are views for explaining the operating theory of the liquid crystal display device.
Figure 8B:
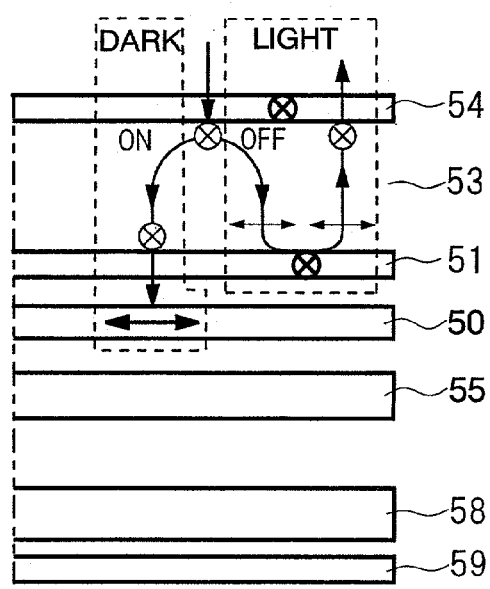

FIGS. 8A and 8B are views for explaining an operating theory of the liquid crystal display device of the present embodiment. FIG. 8A shows a case of transparent mode, and FIG. 8B shows a light path in the case of reflection mode. In these drawings, only necessary factors for explanation among the items of the structure of the liquid crystal display device of the present embodiment in FIG. 3 are shown. In these drawings, a liquid crystal 53 is put between an upper polarizing plate 54 and a lower reflecting polarizing layer 51. The lower substrate 50 and the lower polarizing layer (lower polarizing plate) 55 are formed under the lower reflecting polarizing layer 51. The lighting device 58 is disposed on an outer surface of the lower substrate 50 (in bottom area of the drawing). The reflecting plate 59 is disposed on an outer surface of the lighting device 58.

The upper polarizing plate 54 has a transparent axis in orthogonal direction to the drawing. The lower polarizing layer 55 has a transparent axis which is parallel with the drawing. Also, the lower reflecting polarizing layer 51 has a transparent axis which is orthogonal to the drawing and a reflecting axis which is parallel with the drawing. The opening section 51a for transmitting the light which is emitted from the lighting device 58 is disposed on the lower reflecting polarizing layer 51. Accordingly, the light which transmits through the area where the lower reflecting polarizing layer 51 is not disposed as a light source of the transparent mode is used in the liquid crystal display device. In this point, the liquid crystal display device of the present invention is different from the liquid crystal display device having a structure shown in FIGS. 5A and 5B for displaying in transparent mode by transmitting a part of light component which is parallel with a reflecting axis of the lower reflecting polarizing layer.

The display operation in transparent mode as shown in FIG. 8A is explained as follows.

First, as far as the light to be used for displaying operation which transmits through the opening section 51a is concerned, the light which is emitted from the lighting device 58 is converted to a polarized light which is parallel with the drawing by the lower polarizing layer 55 having a transparent axis which is parallel with the drawing. The light transmits through the lower substrate 50, and transmits through the opening section 51a, and is incident to the liquid crystal 53. If electricity is impressed to the liquid crystal 53 (on-state), the light which is incident to the liquid crystal 53 reaches to the upper polarizing plate 54 without influence of the liquid crystal 53, and is absorbed by the upper polarizing plate 54 having a transparent axis which is orthogonal to the drawing. In this way, dark display of the pixel is performed. On the other hand, if electricity is not impressed on the liquid crystal 53 (off-state), the light which is incident to the liquid crystal 53 is converted to the polarized light which is orthogonal to the drawing by the rotary polarization effect of the liquid crystal 53 and reaches to the upper polarizing plate 54. This light is a polarized light which is parallel with a transparent axis of the upper polarizing plate 54; thus, this light transmits through the upper polarizing plate 54, and light display of the pixel is performed.

Among the light which transmits through the lower polarizing layer 55, as far as the light which does not transmit through the opening section 51a and is reflected on the back surface of the reflecting polarizing layer 51 (on the lower substrate 50) is concerned, this light is reflected by the reflecting polarizing layer 51 and is directed to the lower substrate 58. This light, then, transmits the lower substrate 50 and the lower polarizing layer 55 and returns back to the lighting device 58. Furthermore, this light is reflected by the reflecting plate 59 on near outer side of the lighting device 58 and is directed to the lower polarizing layer 55 to be used again. While this light repeats reflection between the reflecting polarizing layer 51 and the reflecting plate 59, this light transmits through the opening section 51a, then the light is used as the light for the displaying operation. Therefore, in a liquid crystal display device of the present invention, the light which is emitted from the lighting device 58 is not absorbed by the lower polarizing layer 55; thus, the efficiency of the light which is emitted from the lighting device 58 can be enhanced and lighter display operation can be obtained.

Next, the display operation in the reflection mode as shown in FIG. 8B is explained as follows.

As shown in FIG. 8B, the light which is incident from above the upper polarizing plate 54 is converted to a polarized light which is orthogonal to the drawing by the upper polarizing plate 54 having a transparent axis which is orthogonal to the drawing, and the polarized light is incident to the liquid crystal 53. Next, if the liquid crystal is in on-state, this incident light reaches to the lower reflecting polarizing layer 51 without influence of the liquid crystal 53. The lower reflecting polarizing layer 51 has a transparent axis which is orthogonal to the drawing and a reflecting axis which is parallel with the drawing; thus, the light which reaches to the lower reflecting polarizing layer 51 transmits through the lower reflecting polarizing layer 51. The light transmits through the lower substrate 50 and is absorbed by the lower polarizing layer 55 having a transparent axis which is parallel with the drawing. The dark display of the pixel is performed in this way.

On the other hand, if the liquid crystal 53 is in off-state, the light which is incident to the liquid crystal 53 is converted to a polarized light which is parallel with the drawing by a rotary polarization effect of the liquid crystal 53 and reaches to the lower reflecting polarizing layer 51. The light is reflected by the lower reflecting polarizing layer 51 having a reflecting axis which is parallel with the drawing. The light is converted to a polarized light which is orthogonal to the drawing by the rotary polarization effect of the liquid crystal 53 and transmits through the upper polarizing plate 54. The light display operation is performed in this way.

By doing this way, in a liquid crystal display device of the present invention, apart from the case of the liquid crystal display device shown in FIG. 12, the display operation can be performed even if a ¼ wavelength plate 115 is not disposed on an outer surface of the lower substrate 101. Therefore, conversion such as linear polarization to circular polarization, or circular polarization to linear polarization do not occur; thus, the light loss due to such conversion does not occur. By doing in this way, lighter display can be obtained, and brightness in transparent mode can be remarkably enhanced.

Also, in a liquid crystal display device of the present invention, as shown in FIGS. 8A and 8B, the liquid crystal 53 is in an off-state in both transparent mode of a bright display and reflection mode of a bright display. The liquid crystal 53 is in an on-state in both dark display. Therefore, even if an external light is incident on the liquid crystal 53 in a transparent mode, the liquid crystal 53 is in an on-state in pixels of the dark display, as shown in FIG. 8B, the external light which is incident on the liquid crystal 53 is absorbed by the lower polarizing layer 55 on outer surface of the lower substrate 50 and does not return to near side of the upper polarizing layer 54. Thus, the display contrast does not decrease like in the case of the liquid crystal display device 200, and favorable visibility can be obtained.

Also, according to the structure of the liquid crystal display device of the present embodiment, the reflecting polarizing plate 21 is disposed on an outer surface of the lower polarizing plate 20, a light component which is not parallel with a transparent axis of the reflecting polarizing plate 21 among the light which is emitted from the back light 5 is reflected by the reflecting polarizing plate 21 and returns to the back light 5. While the reflection between the reflecting plate 18 and the reflecting polarizing plate 21 is repeated, the polarizing state changes. The light component becomes able to transmit through the reflecting polarizing plate 21 so as to be used for display operation. Therefore, in the liquid crystal display device of the present embodiment, absorption of light by the lower polarizing plate 20 hardly occur; thus, the light from the backlight 5 can be used for the display operation effectively, the display device may become superior in the brightness of the display in transparent mode.

Fourth Embodiment

Figure 4:
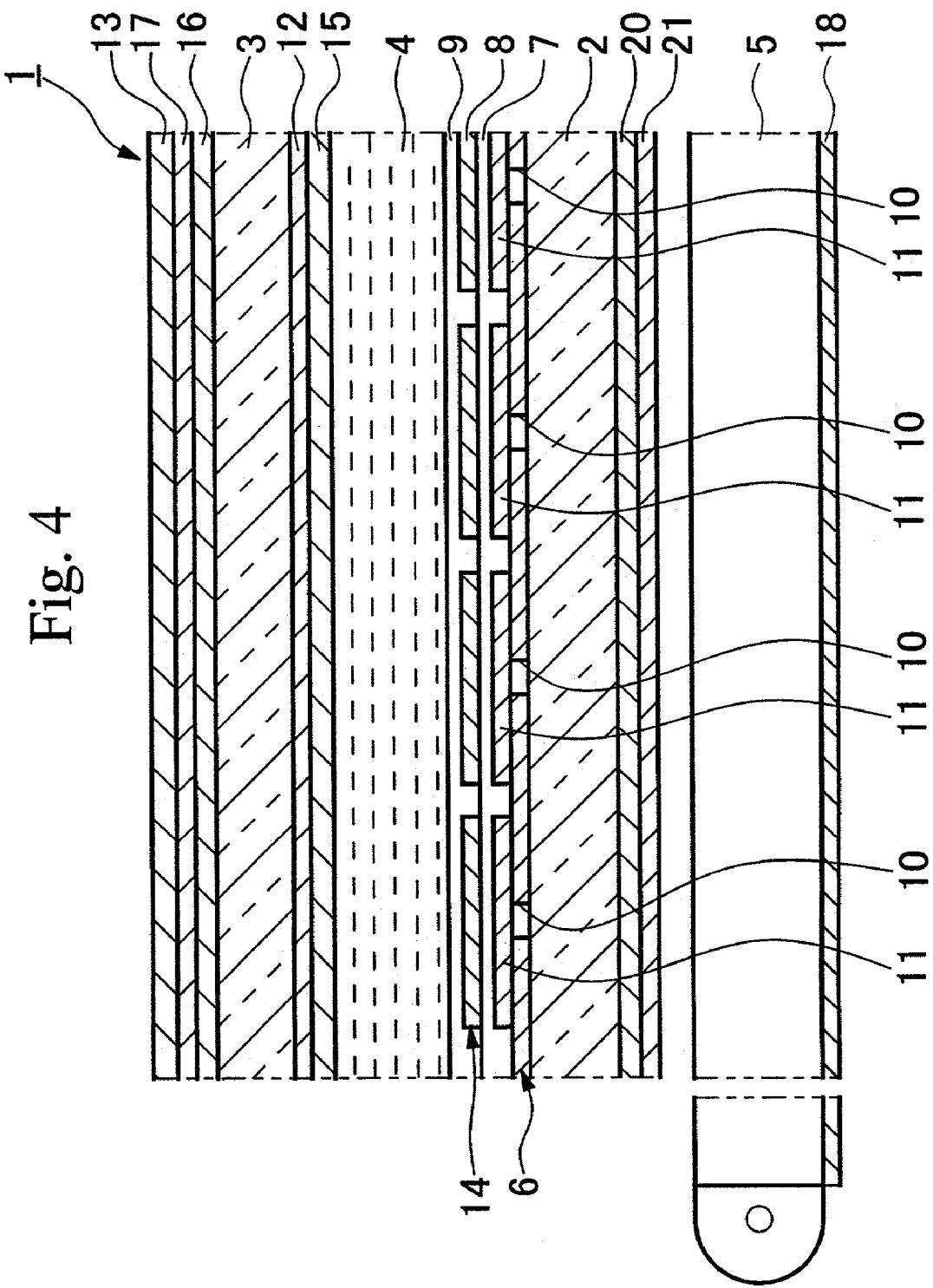
FIG. 4 is a cross section showing a part of a liquid crystal display device of the fourth embodiment of the present invention.

In the present embodiment, the whole structure of the liquid crystal display device of the present embodiment is almost similar to the structure of the liquid crystal display device of the third embodiment shown in FIG. 3, the detailed description is omitted. The liquid crystal display device of the present embodiment is different from the liquid crystal display device of the third embodiment in that a color filter 11 is formed directly on the lower reflecting polarizing layer 36, and in that a flattened layer 7 for flattening gaps of the color filter 11 is disposed on the color filter 11. Only such structure is explained with reference to FIG. 4. FIG. 4 is a cross section showing the liquid crystal display device of the present embodiment. The same reference numeral is added to the items in FIGS. 3 and 4 as long as the items is common therebetween.

In the liquid crystal display device of the present embodiment as shown in FIG. 4, a color filter 11 is disposed on the lower reflecting polarizing layer 36; thus, the color smearing and the parallax can be decreased in reflection mode. This is possible because the color filter 11 is disposed directly on the lower reflecting polarizing layer 36, after the light transmits through one color layer (for example a red color), the light is reflected by the lower reflecting polarizing layer 36 and transmits through the same color layer again.

Electronic Apparatus

An example of electronic apparatus which is provided with a liquid crystal display device according to each embodiment is explained.

Figure 11A:
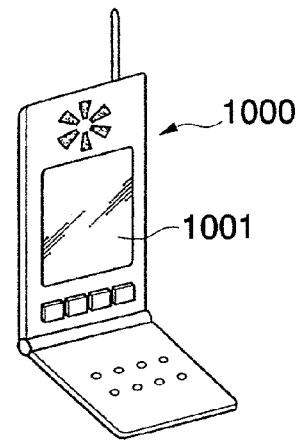
FIGS. 11A to 11C are perspective views showing examples of electronic apparatuses of the present invention.

FIG. 11A is a perspective views for showing an example of mobile phone. In the drawing, a reference numeral 1000 indicates a mobile phone unit. A reference numeral 1001 indicates a liquid crystal display section using above liquid crystal display device.

Figure 11B:
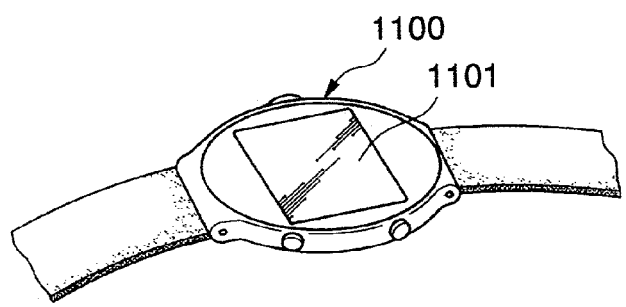

FIG. 11B is a perspective view of an example of a wristwatch type electronic apparatus. In this drawing, a reference numeral 1100 indicates a wristwatch unit. A reference numeral 1101 indicates a liquid crystal display section using above liquid crystal display device.

Figure 11C:
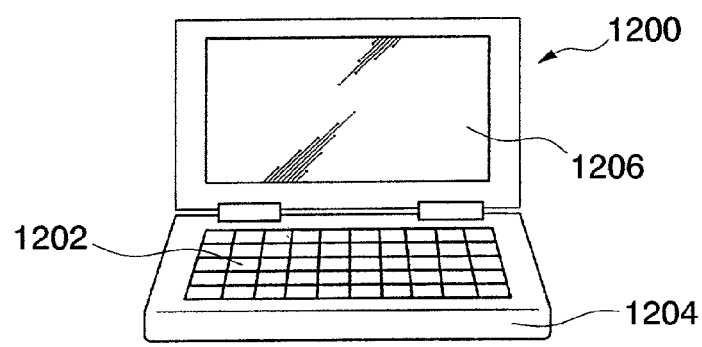

FIG. 11C is a perspective view of an example of a mobile type information processing apparatus such as word processor or personal computer. In this drawing, a reference numeral 1200 indicates an information processing apparatus. A reference numeral 1202 indicates an input section such as keyplate. A reference numeral 1204 indicates an information processing apparatus unit. A reference numeral 1206 indicates a liquid crystal display section using above liquid crystal display device.

Electronic apparatus shown in FIGS. 11A to 11C are provided with liquid crystal display section using liquid crystal display device with above embodiment; thus, an electronic apparatus having display section which can obtain bright display in transparent mode can be realized.

EXAMPLES

Effects of the present invention are explained in the following examples. The present invention is not limited to the following examples.

First Example

As a first example, a liquid crystal display device which is provided with a transflective reflective lower reflecting polarizing layer 6 having a structure shown in FIG. 2 is manufactured. In the examples explained here, every liquid crystal display device is a passive matrix type transflective reflective color liquid crystal display device of which display size is 160 dots×120 dots with dot pitch of 0.24 mm.

In a liquid crystal display device of the first example, the lower reflective polarizing layer 6 is formed by layering a dielectric interfering layer having a structure as shown in FIG. 9. The number of layers of the dielectric interfering layers of the lower reflective polarizing layer 6 is twelve layers (thickness of each layer is about 1 μm), and the pitch of the prismatic groove is 3 μm. The transparency to the polarized light which is parallel with a reflection axis of the reflective polarizing layer was 24%.

Second Example

Next, as a second example, a transflective reflective color liquid crystal display device having the same structure with the first example except that the number of the layers of the dielectric interfering layer of the lower reflective polarizing layer 6 is 5 layers was manufactured. The transparency to the polarized light which is parallel with a reflection axis of the reflective polarizing layer was 65%.

First Comparison Example

Next, as a first comparison example, a liquid crystal display device having a conventional structure shown in FIG. 12 was manufactured.

Evaluation

For liquid crystal display devices of the above first example, second example, and the comparison example, the transparency and the reflectance corresponding to the brightness of the display operation in both transparent mode and reflection mode were measured. Also, contrast in the transparent mode and reflection mode was measured respectively. The results of these measurements are shown in TABLE 1.

On the other hand, in the reflection mode, it was confirmed that the reflectance of the liquid crystal display device of the first example was 3%, and such transparency was equivalent to the case of the liquid crystal display device of the first comparison example, and the contrast in reflection mode was enhanced. The enhancement of the contrast is because the dark display became darker even though the light display remained the same. Also, in the liquid crystal display device of the second example, the reflectance decreases and the contrast in reflection mode deceased slightly as compared to the liquid crystal display device of the first example because the liquid crystal display device was designed with more emphasis on the brightness in a transparent mode.

TABLE 1

|  | First Embodiment | Second Embodiment | First Comparison Example |
| --- | --- | --- | --- |
| Transparency | 6% | 15% | 2% |
| Contrast in Transparent Mode | 16 | 16 | 10 |
| Reflectance | 30% | 11% | 30% |
| Contrast in Reflection Mode | 16 | 10 | 13 |

Table 1

Third Experiment

As a third example, a liquid crystal display device having an opening section 10 on the lower reflecting polarizing layer 36 as shown in FIG. 3 was manufactured. In every liquid crystal display device is a passive matrix type transflective reflective color liquid crystal display device of which display size is 160 dots×120 dots with dot pitch of 0.24 mm.

In a liquid crystal display device of the third example, the lower reflective polarizing layer 36 is formed by layering a dielectric interfering layer having a structure as shown in FIG. 10. The thickness of the lower reflecting polarizing layer 36 is 300 μm. The pitch of the slits is 150 nm. The width of the slit is 75 nm. Also, two opening sections of which size is 0.068 mm×0.022 mm (the area where the lower reflecting polarizing layer 36 is not formed) is formed on the lower reflecting polarizing layer 36 per each pixel so as to be diagonal against the pixels.

Evaluation

For liquid crystal display devices of the above third example and the comparison example, the transparency and the reflectance corresponding to the brightness of the display operation in both transparent mode and reflection mode were measured. Also, contrast in the transparent mode and reflection mode was measured respectively. The results of these measurements are shown in TABLE 2.

As shown in TABLE 2, in a liquid crystal display device of the third embodiment in the present invention, it was affirmed that the transparency enhanced more than three times in comparing to the liquid crystal display device of the first comparison example. Also, it was affirmed that the contrast of the display in the transparent mode was twice as much as the first comparison example. This is because the liquid crystal display device of the third embodiment can use the light from the back light 5 for display operation effectively.

On the other hand, the reflectance ratio of the liquid crystal display device of the third embodiment is 30%. Although this is almost equal to the case of the liquid crystal display device of the first comparison example, it was affirmed that the contrast of the display in reflection mode improved remarkably. Such improvement was achieved because dark display became darker while the brightness of the light display remained.

TABLE 2

|  | Third Embodiment | First Comparison Example |
| --- | --- | --- |
| Transparency | 7% | 2% |
| Contrast in Transparent Mode | 20 | 10 |
| Reflectance | 30% | 30% |
| Contrast in Reflection Mode | 18 | 13 |

What is claimed is:

1. A liquid crystal display device comprising:
an upper substrate;
a lower substrate;
liquid crystals disposed between the upper substrate and the lower substrate;
an upper polarizing layer formed over the liquid crystals;
a lower reflective polarizing layer formed under the liquid crystals having a first transparent axis and a reflective axis being orthogonal;
a lower polarizing layer formed under the liquid crystals having a second transparent axis;
a lighting device disposed under the lower polarizing layer; and a reflecting polarizing plate provided near an outer surface of the lower polarizing layer having a third transparent axis which is nearly parallel with the second transparent axis of the lower polarizing layer, wherein, the lower reflective polarizing layer reflects a part of light which is parallel with the reflective axis and transmits a part of light which is parallel with the reflective axis, and the lower polarizing layer is disposed below the lower reflective polarizing layer;

transparency of the lower reflective polarizing layer with respect to a light which is parallel with the reflective axis is in a range of 20% to 70%;

an angle defined by the first transparent axis of the lower reflective polarizing layer and the second transparent axis of the lower polarizing layer is in range 60 degrees to 120 degrees; and an angle defined by the second transparent axis of the lower polarizing layer and the third transparent axis of the reflecting polarizing plate is in a range of −30 degrees to +30 degrees.

2. A liquid crystal display device according to claim 1, wherein transparency of the lower reflective polarizing layer with respect to a light which is parallel with the reflective axis of the lower reflective polarizing layer is in range of 30% to 50%.

3. A liquid crystal display device according to claim 1, wherein the first transparent axis of the lower reflective polarizing layer and the second transparent axis of the lower polarizing layer are nearly orthogonal.

4. A liquid crystal display device according to claim 1, further comprising a scattering layer, for scattering light which is reflected by the reflecting polarizing layer, disposed upper than the lower reflecting polarizing layer.

5. A liquid crystal display device according to claim 1, further comprising an upper polarizing layer provided on an inner surface of the upper substrate.

6. A liquid crystal display device according to claim 1, further comprising a lower reflecting polarizing layer is provided on an outer surface of the lower substrate.

7. A liquid crystal display device according to claim 1, further comprising color filters provided on an inner surface of the upper substrate or the lower substrate.

8. A liquid crystal display device according to claim 1, wherein the lower reflecting polarizing layer is formed by layering dielectric interference layer having prismatic structure.

9. A liquid crystal display device according to claim 1, wherein the lower reflecting polarizing layer has a plurality of fine slit opening section on a metal reflecting layer.

10. A liquid crystal display device according to claim 9, wherein pitch of the slit opening section is in the range of 30 nm to 300 nm.

11. A liquid crystal display device according to claim 9, wherein transparency of the lower reflecting polarizing layer can be controlled by changing the thickness of the layer of the metal reflecting layer.

12. An electronic apparatus which is provided with a liquid crystal display device according to claim 1.

13. A transflective reflective liquid crystal device comprising:

an upper substrate formed on liquid crystals;

a lower substrate;

the liquid crystals disposed between the upper substrate and the lower substrate;

an upper polarizing layer formed over the liquid crystals;

a lower reflective polarizing layer formed under the liquid crystals, the lower reflective polarizing layer having a first transparent axis and an orthogonal reflective axis and having an opening section;

a lower polarizing layer formed under the liquid crystals having a second transparent axis;

a lighting device disposed outside the lower substrate; and a reflecting polarizing plate provided near an outer surface of the lower polarizing layer having a third transparent axis which is nearly parallel with the second transparent axis of the lower polarizing layer, a lower polarizing layer disposed below the lower reflective polarizing layer, wherein transparency of the lower reflective polarizing layer with respect to a light which is parallel with the reflective axis is in a range of 20% to 70%;

an angle defined by the first transparent axis of the lower reflective polarizing layer and the second transparent axis of the lower polarizing layer is in range of 60 degrees to 120 degrees; and an angle defined by the second transparent axis of the lower polarizing layer and the third transparent axis of the reflecting polarizing plate is in a range of −30 degrees to +30 degrees.

* * * * *